United States Patent [19]

Pickett et al.

[11] 4,278,035
[45] Jul. 14, 1981

[54] MACHINE FOR PLANTING CONTAINERIZED TREE AND SHRUB SEEDLINGS

[75] Inventors: Teddy L. Pickett, Redmond, Wash.; Isidro D. Ignacio, Altadena; Marco Rojas, La Verne, both of Calif.

[73] Assignee: The United States of America as represented by the Secretary of Agriculture, Washington, D.C.

[21] Appl. No.: 130,634

[22] Filed: Mar. 14, 1980

[51] Int. Cl.³ ............................................. A01C 11/00
[52] U.S. Cl. ......................................... 111/2; 111/6; 111/34; 111/89; 221/96
[58] Field of Search ..................... 111/1, 2, 3, 4, 6, 7, 111/34, 73, 80, 89, 92; 221/96; 222/636; 406/63, 64, 65, 66

[56] References Cited

U.S. PATENT DOCUMENTS

| | | | |
|---|---|---|---|
| 516,745 | 3/1894 | Pitt | 111/3 |
| 1,475,061 | 11/1923 | Frawley | 111/2 |
| 1,657,944 | 1/1928 | Stocker et al. | 111/3 |
| 2,520,809 | 8/1950 | Miller | 111/7 |
| 2,749,855 | 6/1956 | Guigas | 111/3 |
| 3,306,239 | 2/1967 | Martin | 111/1 |
| 3,394,667 | 7/1968 | White | 111/89 X |
| 3,712,252 | 1/1973 | Huang | 111/2 |
| 3,719,158 | 3/1973 | Roths | 111/2 |
| 3,943,863 | 3/1976 | Leonard et al. | 111/2 |
| 3,998,171 | 12/1976 | Lofgren et al. | 111/2 |
| 4,091,751 | 5/1978 | Dri et al. | 111/2 |
| 4,111,135 | 9/1978 | Braun | 111/2 |
| 4,116,137 | 9/1978 | Westerhoven | 111/2 |
| 4,186,671 | 2/1980 | Huang | 111/2 |

FOREIGN PATENT DOCUMENTS

| | | | |
|---|---|---|---|
| 7811699 | 6/1980 | Netherlands | 111/2 |
| 207548 | 12/1967 | U.S.S.R. | 111/89 |
| 211915 | 2/1968 | U.S.S.R. | 111/89 |

*Primary Examiner*—James R. Feyrer
*Attorney, Agent, or Firm*—M. Howard Silverstein; David G. McConnell

[57] ABSTRACT

A seedling planter consisting of a portable frame on which is mounted a horizontally rotatable, vertically movable index plate carrying a vertically movable, normally lowered scraper blade, a telescopic seedling drop tube, an auger, an auger hydraulic motor and a gear box coupling the motor to the auger. A carousel tray containing seedlings is rotatably mounted on the frame over the index plate, being rotatable stepwise by a pawl on the end of the piston rod of a retraction-extension hydraulic cylinder mounted on the frame. A programming circuit operates solenoid valves activating respective hydraulic cylinders to perform a cycle consisting of first retracting the index plate, causing scraping of the ground, then elevating the scraper blade, then lowering the index plate and operating the auger so as to dig a hole, then raising and extending the index plate to bring the drop tube over the hole and to cause the carousel tray to rotate one step to bring a seedling over the hole and open a water valve to deliver a quantity of water under pressure over the seedling to drive it through the drop tube into the hole, then extending a packing blade to pack soil around the seedling, and then resetting the parts to starting positions.

17 Claims, 11 Drawing Figures

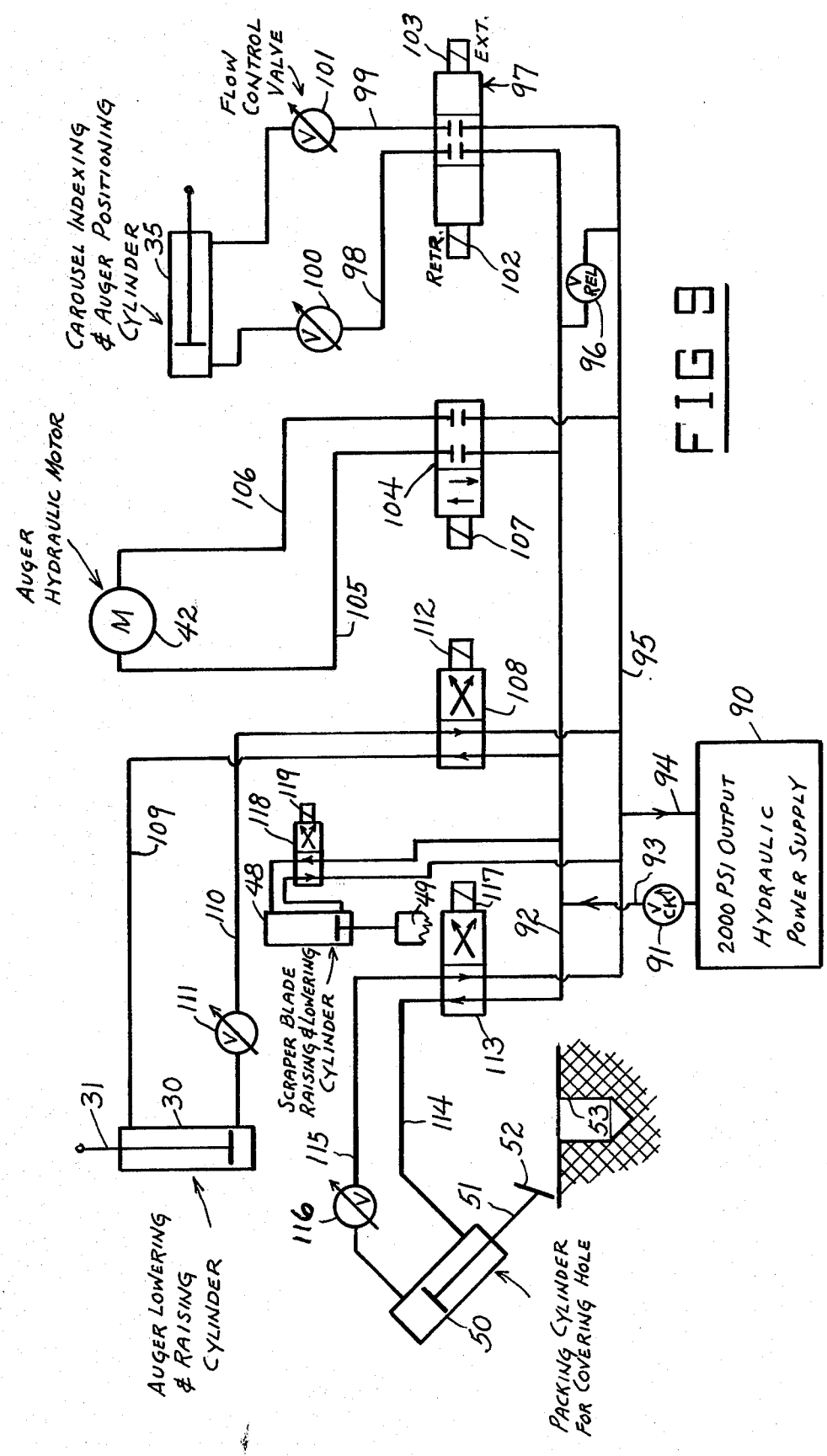

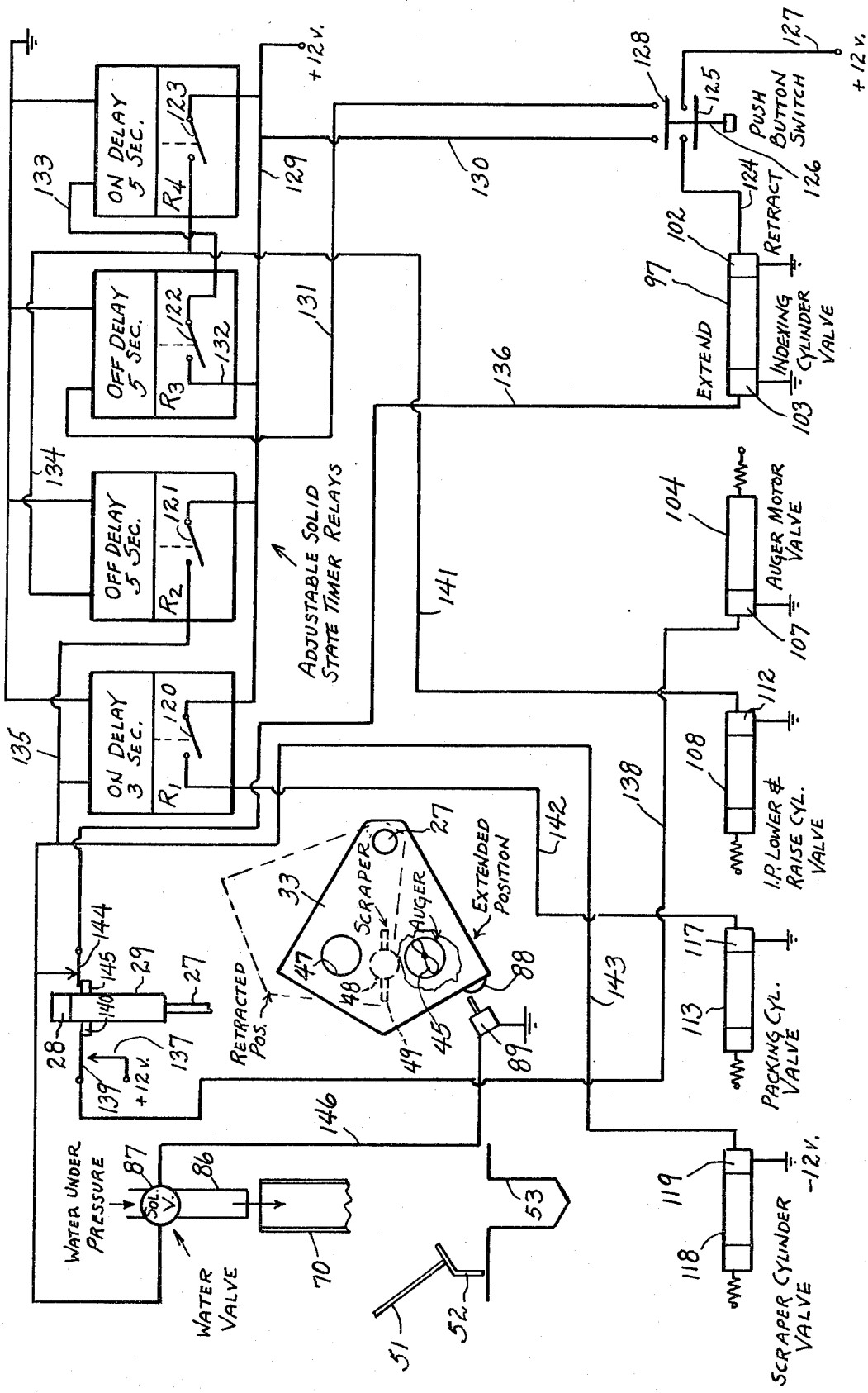

MACHINE FOR PLANTING CONTAINERIZED TREE AND SHRUB SEEDLINGS

FIELD OF THE INVENTION

This invention relates to mechanical planters, and more particularly to an improved automated machine for planting nursery stock such as tree and shrub seedlings, and which is especially suited for planting such seedlings on slopes and irregular terrain, and which performs the required steps automatically without requiring human intervention.

BACKGROUND OF THE INVENTION

Ordinarily, considerable human labor is required for the planting of nursery stock, such as tree or shrub seedlings, particularly on slopes or other irregular terrain. In planting the seedlings, it is first necessary to transport them to the planting site, clear the immediate planting area, dig a hole to proper depth for each plant, place the seedling in the hole, suitably moisten the plant, and then pack the soil around the plant root system to insure proper nourishment and growth of the seedling.

Various mechanical aids and planting devices have been proposed, but these devices have not been satisfactory mainly because they are not self-contained and because they cannot perform all the necessary steps in proper sequence and in a reasonably short time without considerable human supervision and labor. Also, in most cases the prior devices involve a considerable amount of individual handling of the seedlings in performing one or more of the required planting steps. Furthermore, use of the prior proposed planting machines is not practical on irregular terrain or on slopes.

A preliminary search of the prior art revealed the following prior U.S. patents of interest:
 Miller, U.S. Pat. No. 2,520,809
 Guigas, U.S. Pat. No. 2,749,855
 Martin, U.S. Pat. No. 3,306,239
 Huang, U.S. Pat. No. 3,712,252
 Roths, U.S. Pat. No. 3,719,158
 Dri et al, U.S. Pat. No. 4,091,751
 Braun, U.S. Pat. No. 4,111,135
 Westerhoven, U.S. Pat. No. 4,116,137

SUMMARY OF THE INVENTION

The machine of the present invention automatically digs holes and then plants containerized seedlings (nursery stock sometimes called "tubelings") of trees and shrubs, and then packs soil around the seedlings. The machine is adapted to be transported by a crane, or similar vehicle, and is especially adapted for operation on relatively steep slopes and in rough terrain.

In general, the machine comprises a frame which is suspended from the boom of a crane, or similar vehicle, which can be operated to place the frame in a desired planting location. A horizontally rotatable and vertically movable index plate is provided on the frame, said index plate being provided with a normally lowered, vertically retractile scraper blade, a telescopic seedling drop tube and a digging auger. A carousel tray containing a substantial number of circularly arranged seedling tubes is rotatably mounted on the frame over the index plate and is rotatable stepwise by a pawl driven by a solenoid valve-controlled retraction-extension hydraulic cylinder mounted on the frame. Respective other solenoid valve-controlled hydraulic cylinders and an auger motor are provided, controlled by a programming circuit. The programming circuit is operated by a push button switch to perform a cycle consisting of first horizontally retracting the index plate, causing scraping of the ground area where the planting is to occur, then elevating the scraper blade, then lowering the index plate and activating the auger so as to dig a hole, then raising and horizontally extending the index plate to bring the drop tube over the hole; at the same time the carousel tray is rotated by the pawl through one step to bring a seedling over the drop tube. At the end portion of the extension of the index plate a solenoid valve for a pressurized water supply conduit is energized so as to deliver a quantity of water under pressure onto the seedling and drive the seedling through the drop tube into the hole. Shortly thereafter a packing blade is extended to pack soil around the seedling, and after this the parts are reset to starting positions.

Accordingly, a main object of the invention is to provide a novel and improved seedling planting machine which overcomes the deficiencies and disadvantages of previously available planting machines.

A further object of the invention is to provide an improved automated seedling planting machine which is arranged to automatically plant containerized tree or shrub seedlings and which can be efficiently used on slopes or on irregular terrain.

A still further object of the invention is to provide an improved automated seedling planting machine which can be readily positioned for planting seedlings, even on steep slopes or on irregular terrain, and which automatically sequentially performs the various steps required for correct planting of seedlings, without requiring human intervention, and which performs these steps efficiently and rapidly.

A still further object of the invention is to provide an improved seedling planter which includes a step-actuated carousel tray containing a substantial number of containerized seedlings which can be planted in sequence, enabling said substantial number of seedlings to be planted in successively selected locations without requiring handling of the seedlings or human labor.

A still further object of the invention is to provide an improved automated machine for planting containerized tree or shrub seedlings, said machine being readily usable on irregular terrain or on slopes, and being arranged to perform, in proper sequence, all the necessary steps required for properly planting a seedling, including first scraping the planting area, then digging a hole, then positioning a seedling over the hole, then delivering water under pressure onto the seedling to drive it into the hole, and then extending a packing blade to pack soil around the seedling root system to insure proper growth conditions for the seedling.

A still further object of the invention is to provide an improved automated machine of the carousel type for successively planting containerized tree or shrub seedlings, said machine being arranged to perform in proper sequence all the necessary steps for properly planting a seedling, and having arrangements for automatically advancing the containerized seedlings into discharge positions over the holes prepared for receiving the seedlings, so that the successive seedlings will be planted in successively selected locations without requiring the handling of the seedlings by the operator.

BRIEF DESCRIPTION OF THE DRAWINGS

Further objects and advantages of the invention will become apparent from the following description and claims, and from the accompanying drawings, wherein:

FIG. 9 is a schematic diagram of the hydraulic operating circuit of a seedling planting machine according to the present invention.

FIG. 10 is a schematic electrical wiring diagram of a typical programming system which may be employed in accordance with the present invention, with the hydraulic circuit of FIG. 9.

DESCRIPTION OF PREFERRED EMBODIMENTS

Figure 1:
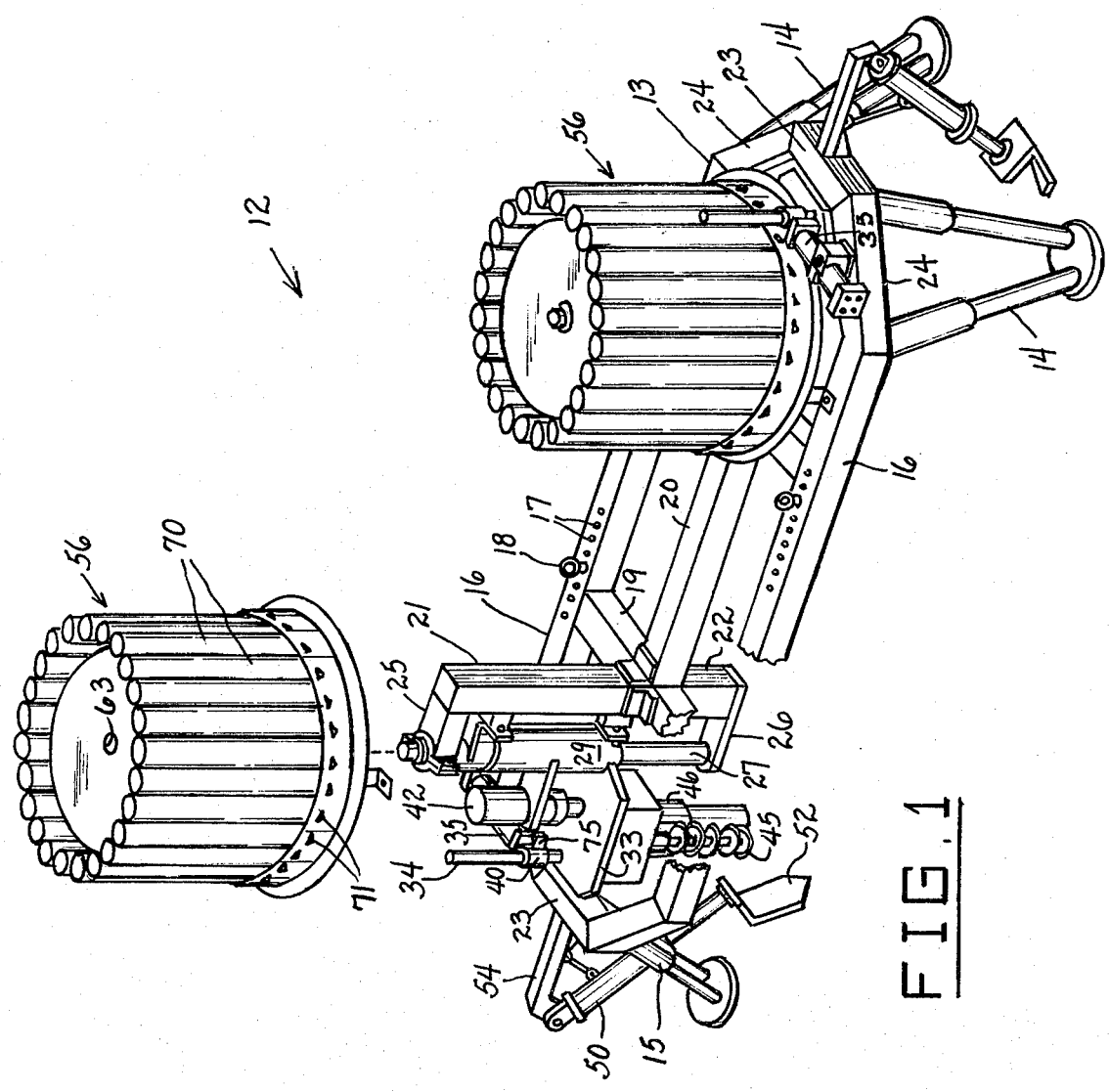
FIG. 1 is a perspective view, partly broken away, of a seedling planting machine according to the present invention, shown with one of the containerized seedling carousel trays lifted off the machine to show associated inner structure.

Referring to the drawings, and more particularly to FIGS. 1 to 4, 12 generally designates a typical tree or shrub seedling planting machine constructed in accordance with the present invention. The machine 12 comprises an elongated, generally rectangular portable frame 13 having a pair of depending downwardly and outwardly extending supporting leg structures 14, 14 at the corners of one end thereof, and having a depending downwardly and outwardly extending supporting leg structure 15 at the opposite end thereof, said leg structures being adapted to support the frame in a stable position over a selected planting site. The frame 13 includes opposite longitudinal square tubing 16, 16 formed with holes 17 to receive eye bolts 18 enabling the frame to be suspended from the boom of a conventional crane vehicle, or other suitable vehicle, by means of suitable cables, not shown, whereby the machine may be transported to and lowered onto a selected planting site, for example, on a slope adjacent to a highway. In the typical embodiments herein described and illustrated in the drawings, the frame is designed to carry two identical planting mechanisms, each being located at a respective end of the frame. In the following description, the detailed elements associated with only one of the planting mechanisms will be described, it being understood that the same elements are employed for the other mechanism. Thus, for each planting mechanism the frame is provided with a rigidly mounted crossbar 19, the two crossbars being rigidly connected by a central longitudinal frame bar 20. The frame also includes vertical post members 21 forming the intersections of the longitudinal bar 20 with the respective crossbars 19, said post members having lower portions 22 depending below the longitudinal bar 20. Said frame is provided with opposite transverse end bars 23, 23 rigidly connected by divergent short frame bars 24, 24 to the adjacent ends of the side bars 16, 16.

Rigidly connected to the top end of post member 21 is a longitudinally extending horizontal arm 25, and rigidly connected to the bottom end of depending post portion 22 is a longitudinally extending arm 26. A vertical stationary shaft 27 is supportingly mounted in the free end portion of the bottom arm 26 and is rigidly clamped at its top portion to the end portion of top arm 25. A collar member 28 is rigidly secured on the upper portion of shaft 27 subjacent arm 25. An elongated vertical sleeve member 29 is slidably and rotatably engaged on fixed shaft 27. A vertical hydraulic cylinder 30 is rigidly secured to sleeve member 29 in spaced parallel relation therewith and has its piston rod 31 extending sealingly and slidably through its top end, said piston rod being rigidly connected to collar member 28 by a bracket arm 32. The hydraulic cylinder 30 is employed to raise and lower the sleeve member 29 between limiting positions established by upper abutment collar 28 and bottom abutment arm 26.

Figure 2:
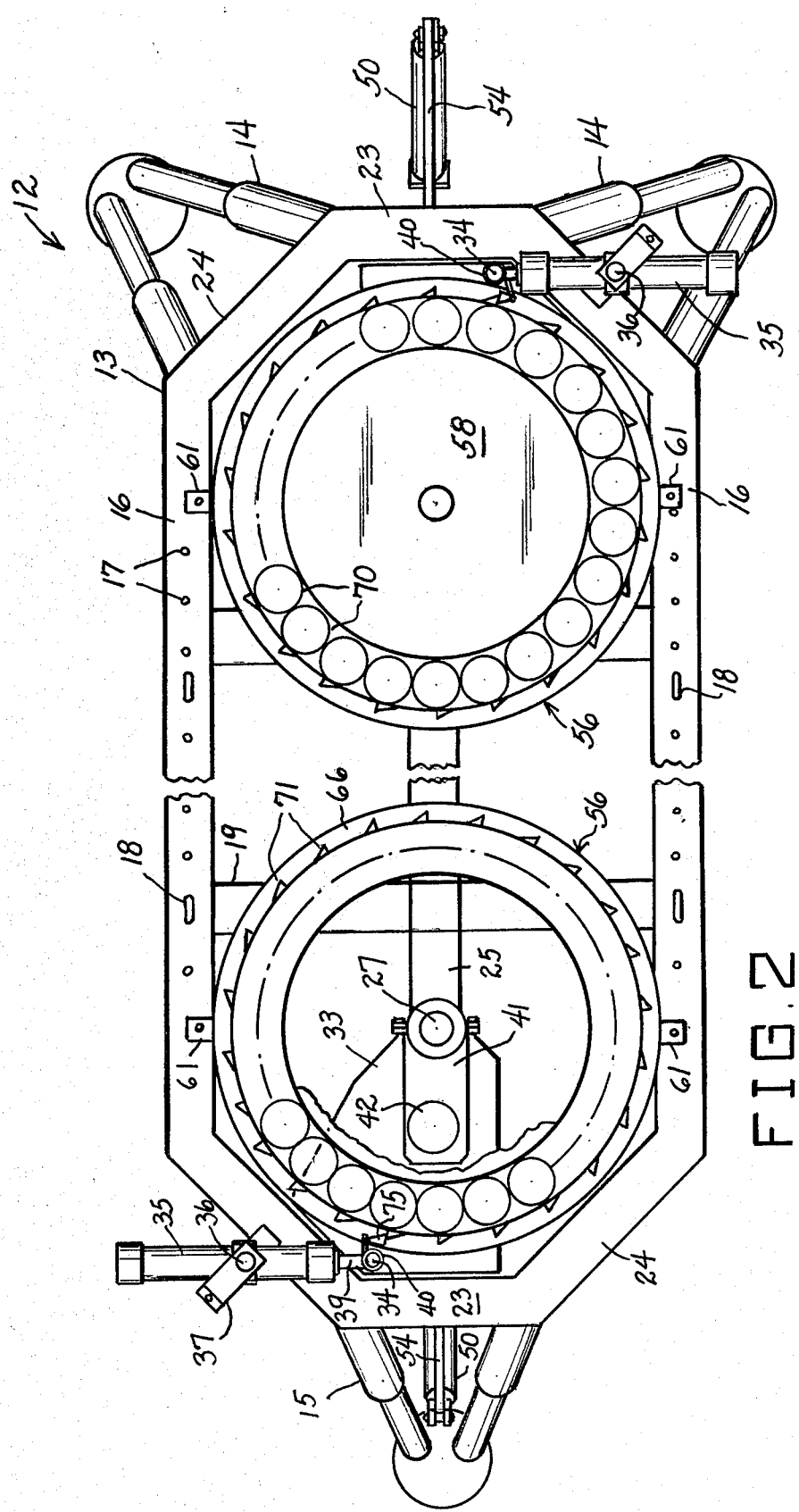
FIG. 2 is an enlarged top plan view, partly broken away, of the seedling planting machine of FIG. 1.
Figure 3:
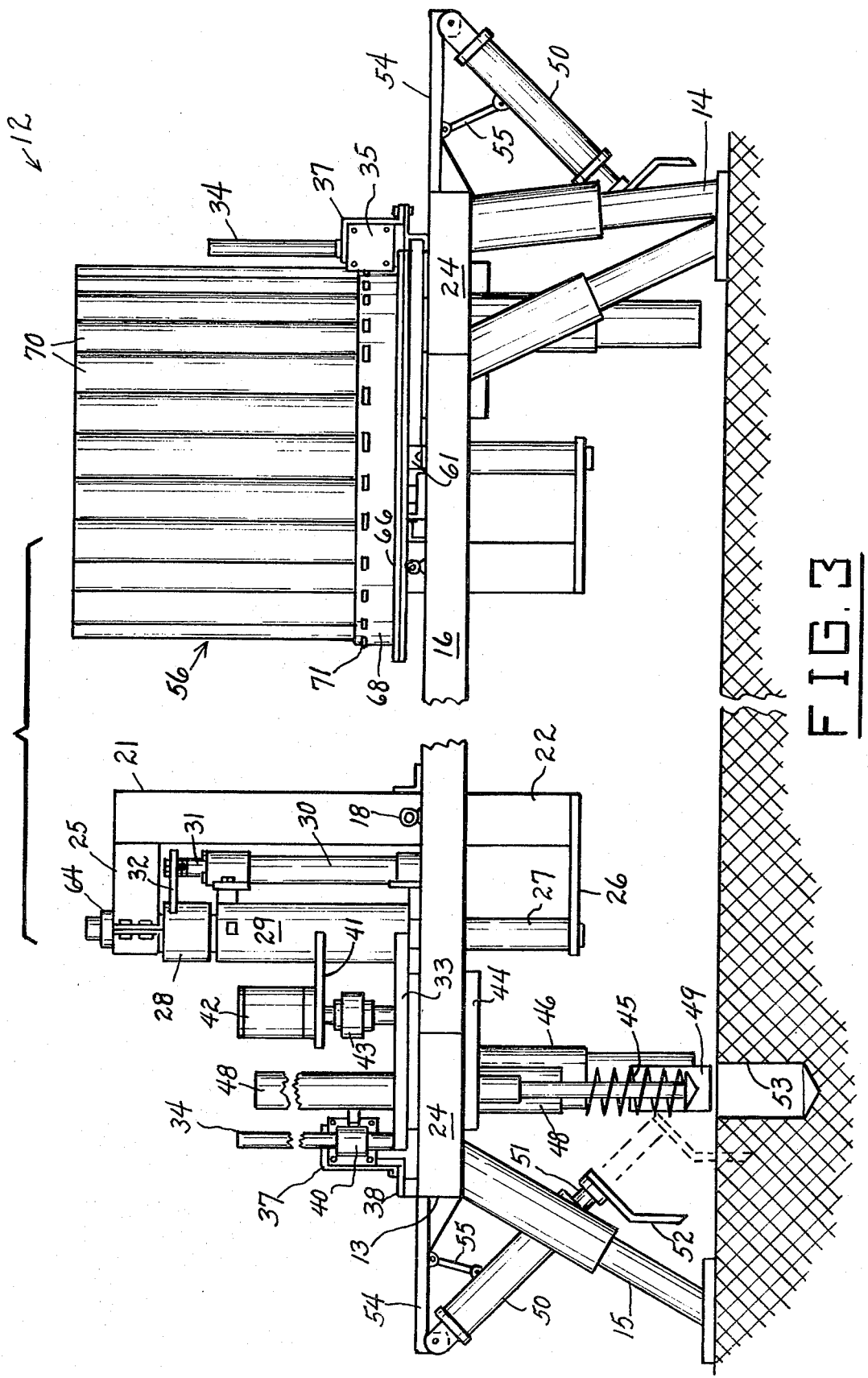
FIG. 3 is an enlarged side elevational view, partly broken away, of the seedling planting machine of FIG. 1.
Figure 4:
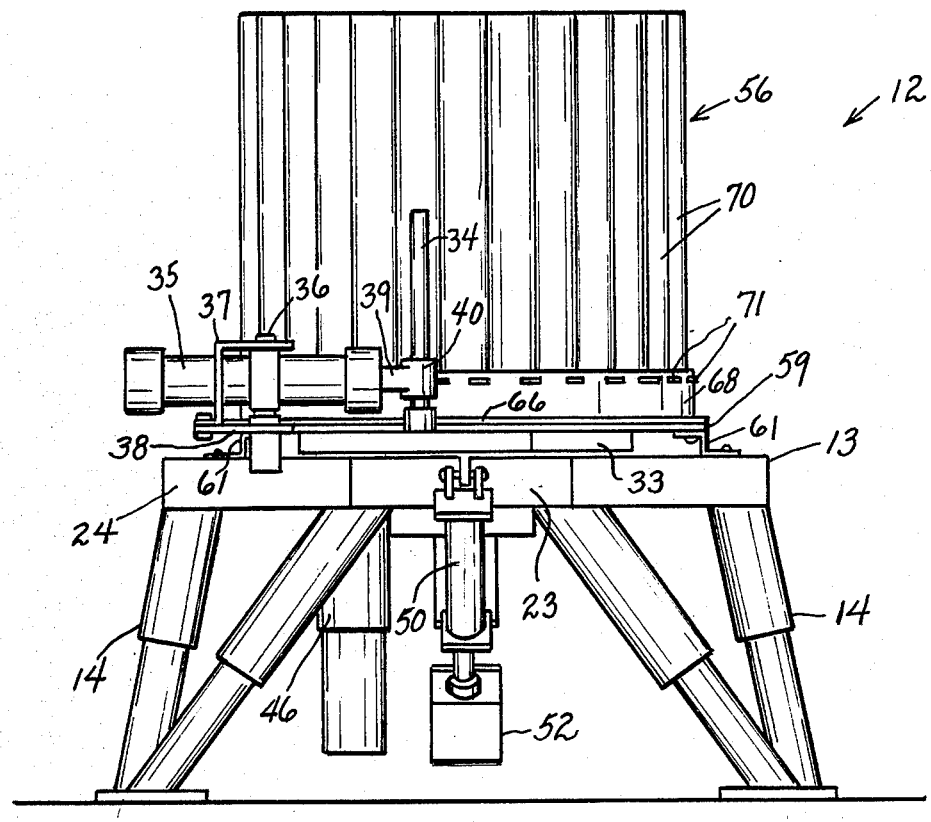
FIG. 4 is an enlarged end elevational view of the seedling planting machine of FIG. 1.

Rigidly secured to and extending horizontally from the lower end portion of sleeve member 29 is an index plate 33, which in its normally elevated position is spaced slightly above the level of the frame 13, as shown in FIG. 3. Rigidly secured on the outer end portion of plate 33 is an upstanding vertical shaft 34. An indexing hydraulic cylinder 35 is horizontally and pivotally mounted on the frame 13, substantially transversely thereof, near the end bar element 23, as shown in FIG. 2, being pivotally connected at an intermediate portion thereof, shown at 36, between the top arm of a Z-shaped bracket 37 and a bottom supporting bracket 38 rigidly connecting the bottom flange of the Z-bracket 37 to the adjacent frame bar portion 24, as shown in FIG. 4. The piston rod 39 is provided with an end sleeve 40 rotatably receiving the upstanding bearing shaft 34. In FIGS. 2 and 4 the piston rod 39 is shown in its retracted position. Extension of said piston rod rotates index plate 33 in a counterclockwise direction, as viewed at the left side of FIG. 2.

A horizontal supporting plate 41 is rigidly secured to vertical sleeve 29 and carries a vertically mounted hydraulic motor 42. The shaft of motor 42 is connected via a coupling 43 and a conventional reducing gear assembly 44, secured to the underside of plate 33, to a depending vertical ground-digging auger 45. In the retracted position of piston rod 39, shown in FIG. 2, the auger is located to dig a hole at the desired location for planting, as will be presently described.

Designated at 46 (see FIG. 3) in a telescoping depending seedling delivery tube, or "drop tube", depending from a delivery aperture 47 (see FIGS. 8 and 10) provided in index plate 33 at the same radial distance from shaft 27 as auger 45 but angularly spaced therefrom by an angle corresponding to the angle of clockwise rotation of said index plate produced by the extension stroke of piston rod 39, namely, through the angle required to move the drop tube 46 into registry with a planting hole dug by the auger, as will be presently described.

Vertically secured to and depending from gear box 44 at the same radial distance as auger 45 and drop tube 46, but substantially midway between them, is a scraper hydraulic cylinder 48 whose piston rod carries a scraper blade 49 which is located so as to scrape the ground and clear it for digging during the initial retraction stroke of cylinder 35, as will be presently described. The scraper blade can be elevated to permit the descent of the index plate 33 and the auger 45, for digging the required planting hole, by activating the hydraulic cylinder 48.

At each end of the frame 13 there is provided a downwardly and inwardly directed packing blade cylinder 50 located substantially in the central longitudinal vertical plane of the frame, with a piston rod 51 carrying a depending packing blade 52 for packing soil around a seedling deposited in a hole 53 dug by the auger 45, as shown in FIG. 3. The cylinder 50 may be connected at its top end to a longitudinal arm 54 projecting outwardly from the end frame bar 23 and may be supported in a suitably inclined position by a supporting link rod 55 connecting the intermediate portion of the longitudinal arm 54 to the intermediate portion of the cylinder. In the retracted position of the piston rod 39, shown in FIG. 2, the auger 45 is located substantially in said longitudinal vertical plane, so that the planting hole 53 will be properly located with respect to the packing blade 52. In the normal position of packing blade 52 it is elevated, as shown in FIG. 3 in full line view, but when cylinder 50 is activated, the blade 52 is extended substantially to its dotted view position.

The carousel assemblies carrying the containerized seedlings are designated generally at 56, 56. Each carousel assembly 56 comprises a generally hat-shaped body having a cylindrical main portion 57 (see FIGS. 2, 7 and 8) with a circular top wall 58 and an annular bottom flange 59 which has a seedling discharge aperture 60. The hat-shaped body is fixedly secured on the frame 13 coaxially with the associated fixed vertical shaft 27, for example, by diametrically opposed Z-shaped brackets 61, 61 connecting the flange 59 to the opposite longitudinal square tubes 16, 16, as shown in FIGS. 2, 3 and 4. Flange 59 is provided with a layer 62 of suitable bearing material, such as Teflon, or the like. The top wall 58 has a central aperture 63 which receives the top end of fixed vertical shaft 27 and allows said top wall to bear on a collar 64 provided on shaft 27 above arm 25 (see FIG. 3) insuring rigidity of the stationary hat-shaped body of the assembly.

Figure 8:
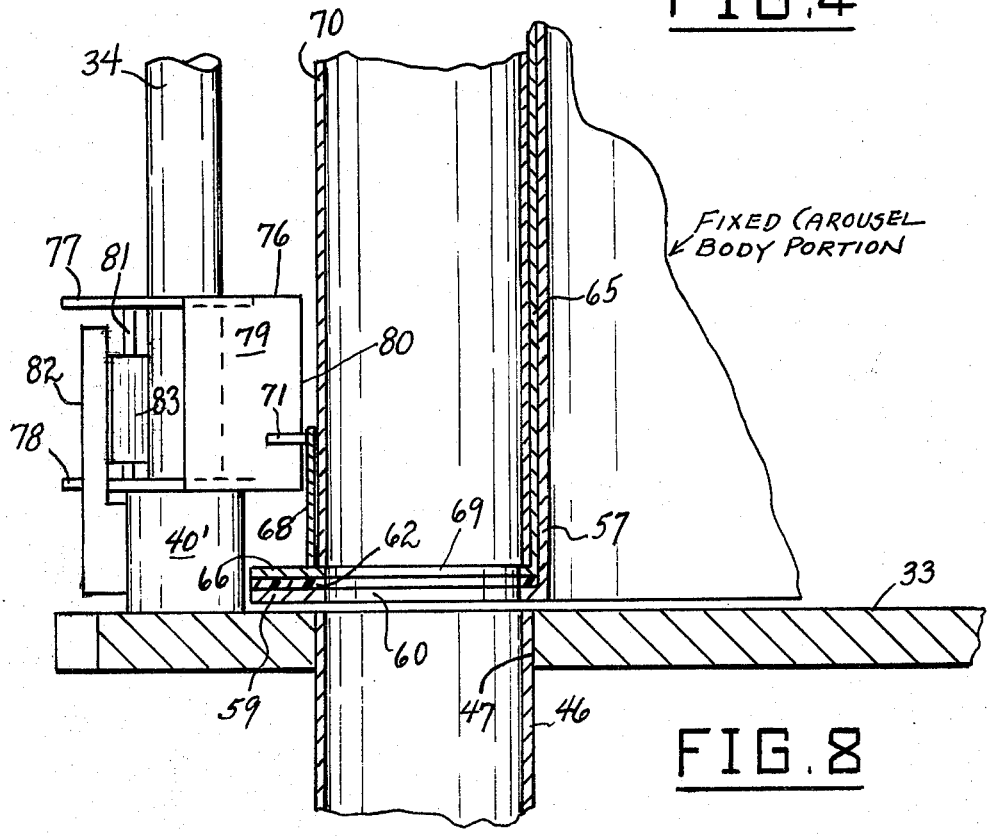
FIG. 8 is an enlarged fragmentary vertical cross-sectional view taken substantially on line 8—8 of FIG. 5.
Figure 7:
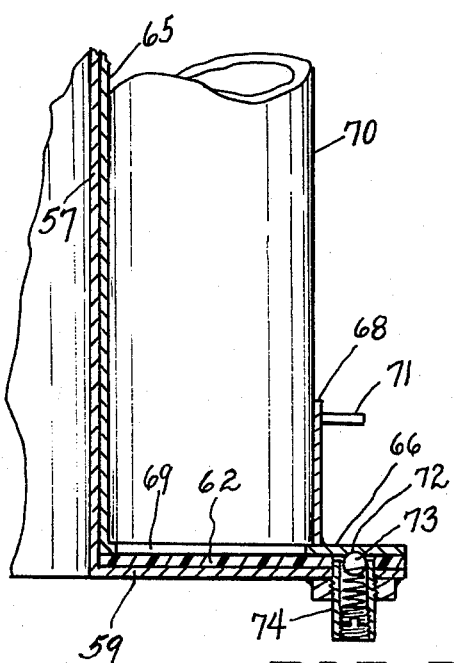
FIG. 7 is an enlarged fragmentary vertical cross-sectional view taken substantially on line 7—7 of FIG. 5.

An annular channel-shaped rotatable carrier for the containerized seedlings is provided, said carrier having a cylindrical inner wall 65, an annular bottom flange 66 forming the bottom wall of the carrier, and an upstanding relatively short cylindrical outer retaining wall 68, as shown in FIGS. 7 and 8. Bottom flange 66 is formed with circular discharge apertures 69 registering with the cylindrical seedling containers, shown at 70, said containers 70 being received vertically between the inner wall 65 and the outer retaining wall 68, as shown in FIGS. 7 and 8. The outer wall 68 is provided with regularly spaced indexing ratchet teeth 71 projecting outwardly from its upper portion.

As shown in FIG. 7, flange 66 is formed with uniformly spaced bottom indexing recesses 72 to yieldingly receive a springbiased detent ball 73 forming part of a ball detent assembly 74 mounted in stationary flange 59 and extending through bearing lining 62. The detent recesses 72 are spaced to correspond with the respective indexing steps required to move the seedling containers successively into registry with the seedling discharge aperture 60 of stationary flange 59 for successive planting cycles of the machine, presently to be described.

In the embodiment of FIGS. 1 to 4, a pawl member 75 is resiliently secured to piston rod sleeve member 40 and is located so as to drivingly engage with a ratchet tooth 71 with each extension stroke of piston rod 39, namely, with each activation of indexing cyclinder 35, to thereby advance the seedling carrier one delivery step. On the subsequent retraction stroke, the resiliently mounted pawl 75 slides past the adjacent ratchet tooth 71, the seedling carrier being then held against movement by the detent ball 73, seated in the last-engaged detent recess 72.

Figure 5:
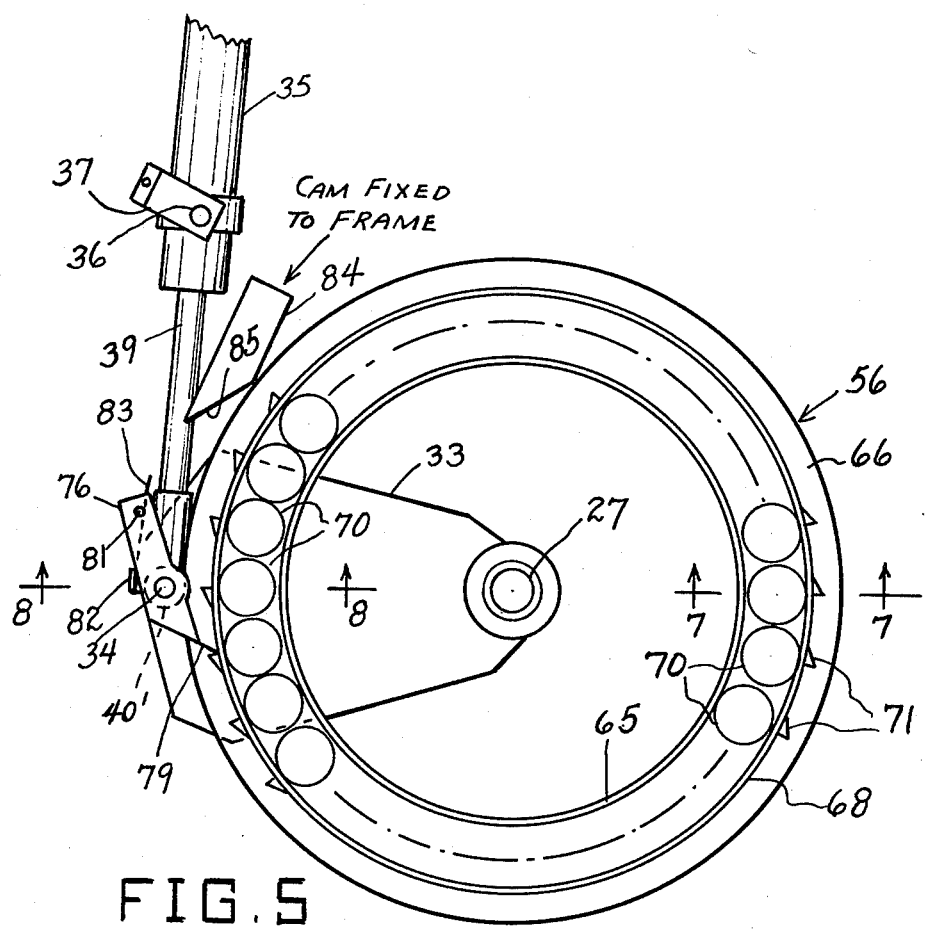
FIG. 5 is an enlarged fragmentary top plan view of one of the carousel trays and a modified form of an index-plate rotating pawl arrangement, as employed in a seedling planting machine according to the present invention, the index plate being shown in an extended (planting) position.
Figure 6:
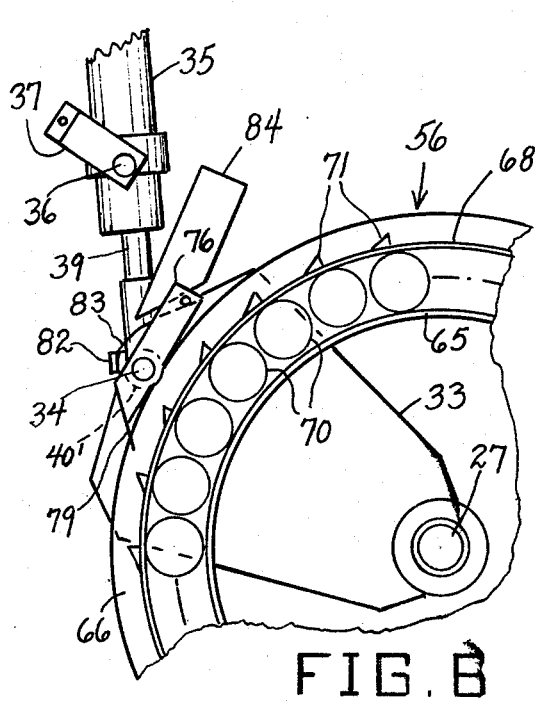
FIG. 6 is a fragmentary top plan view of the structure of FIG. 5 showing the index plate in a retracted (normal) position.

In the modification shown in FIGS. 5, 6 and 8, a pawl member, shown at 76, is pivoted on the upstanding shaft 34 and consists of spaced parallel identical top and bottom elongated plate members 77, 78 rotatably engaged on shaft 34 above and supported on the end bearing sleeve member 40' of piston rod 39. The elongated plate members 77, 78 have inclined front edges which are rigidly connected by a vertical rectangular plate member 79 having a vertical front edge 80. The rear end portions of the elongated plate members 77, 78 are connected by a vertical pin 81.

An upstanding vertical arm 82 rigidly secured to bearing sleeve member 40' extends upwardly past lower plate member 78, as shown in FIG. 8. A flat elongated spring 83 is rigidly connected at its front end to vertical arm 82 and bears against pin 81, biasing the pawl member 76 counterclockwise, as viewed in FIGS. 5 and 6, namely, in a direction urging the pawl edge 80 toward the outer retaining wall 68. A stationary cam 84 is suitably fastened to the frame 13 and has an inclined camming edge 85 located in the path of retractile movement of the vertical pin 81, being receivable between the spaced top and bottom plate members 77, 78. When rod 39 is retracted, the stationary cam is engaged by pin 81, causing the pawl edge 80 to be rotated clear of the ratchet teeth 71, as shown in FIG. 6. Extension of rod 39 causes pin 81 to disengage from cam 84, allowing pawl edge 80 to drivingly engage a ratchet tooth, as in FIG. 5, showing the pawl 76 at the end of the extension stroke of index plate 33. At this point, a seedling to be planted has been placed in a position of vertical registry with the discharge opening 60 and the drop tube 46.

A vertical, downwardly directed, discharge conduit 86 (see FIG. 10) is rigidly secured to the frame 13 by suitable bracket means, not shown, in a position to discharge into the top of a seedling container 70 when it is in the position of FIG. 8, namely, in registry with the discharge aperture 60 of the fixed carousel flange 59. The conduit 86 is connected to a suitable source of water under pressure through a normally closed solenoid valve 87. As will be presently explained, valve 87 is energized to open responsive to the extension of index plate 33 to its discharge position, namely, to the position shown in FIG. 8, wherein the drop tube 46 is in registry with said discharge aperture 60. The valve 87 is energized for a short time near the end of the extension stroke of index plate 33 by the passing engagement of a cam 88 on the edge of index plate 33 with the operating plunger of a stationary microswitch 89 suitably mounted on frame 13. This passing engagement opens the valve 87 at the appropriate point in the planting cycle, as will be presently described, to provide a short sustained pulse of pressurized water injected into the top of the subjacent seedling container 70, sufficient to force the seedling downwardly into the seedling hole 53 previously formed therebelow, and to adequately moisten the seedling and the surrounding soil.

Referring to FIG. 9, a typical hydraulic circuit for the above-described seedling planting machine 12 is illustrated. The hydraulic circuit comprises a conventional hydraulic power supply pump unit 90, which may be mounted on the associated supporting vehicle, said unit 90, for example, having a 2000 PSI output. The high pressure output conduit 93 of the unit 90 is connected via a check valve 91 to a high pressure line 92. The return conduit 94 is connected to a return line 95. A conventional relief valve 96 is connected across the lines 92, 95.

The hydraulic carousel indexing cylinder 35 is connected to the lines 92, 95 via a conventional normally-closed reversing solenoid valve 97 and conduits 98, 99, including respective adjustable flow control valves 100, 101. The valve 97 has an index plate retraction solenoid 102 and an index plate extension solenoid 103, adapted to be alternately energized, as will be presently described.

The hydraulic motor 42 is connected to lines 92, 93 via a conventional normally closed solenoid valve 104 and conduits 105, 106. Valve 104 has a valve-opening solenoid 107.

The auger lowering and raising cylinder 30 is connected across lines 92, 95 via a conventional reversing solenoid valve 108 and lines 109, 110, including an adjustable flow control valve 111. As will be presently described, cylinder 30 and sleeve member 29 are in elevated positions relative to piston rod 31 at the beginning of a planting cycle, reversing valve 108 being then deenergized and being biased to the condition illustrated in FIG. 9. Valve 108 has an operating solenoid 112 which reverses the valve when energized. Reversal of the valve causes cylinder 30 and sleeve member 29 to descend.

The packing cylinder 50 is connected to lines 92, 95 via a conventional reversing valve 113 and lines 114, 115, including an adjustable flow control valve 116. The valve 113 has an operating solenoid 117 which, when energized, reverses valve 113 and causes the packing blade 52 to be extended. Normally, valve 113 maintains the packing blade in a retracted position.

The scraper cylinder 48 is connected to lines 92, 95 via a conventional solenoid-operated reversing valve 118 having an operating solenoid 119. Valve 118 normally maintains the scraper blade 49 in a lowered position (at the beginning of a planting cycle). The scraper blade 49 is elevated by the reversal of valve 118 responsive to the energization of solenoid 119.

Referring to FIG. 10, a typical timing circuit for performing a planting cycle with the above-described seedling planting machine is illustrated. The typical timing circuit comprises a conventional off-delay relay, set for 5 seconds off-delay, shown at $R_2$, a conventional on-delay relay $R_1$, set for 3 seconds on-delay, a conventional off-delay relay $R_3$, set for 5 seconds off-delay, and a conventional on-delay relay $R_4$, set for 5 seconds on-delay. The relays $R_1$ to $R_4$ are preferably of the adjustable-delay type, to enable programming of the various cycle events to desired time values other than those typically employed herein.

The respective normally open switch contacts of the delay relays $R_1$ to $R_4$ are shown respectively at 120, 121, 122 and 123.

The circuit employs a suitable power source, such as a 12-volt battery which has a grounded negative terminal. The "retract" solenoid 102 of indexing cylinder valve 97 has one terminal grounded and its other terminal connected via a wire 124 and the lower contacts associated with the lower pole 125 of a two-pole push button switch 126, to a +12 volt terminal wire 127. The upper contacts, associated with the upper pole 128 of switch 126 are connected between a +12 volt line 129 and one terminal of the winding of relay $R_3$, via wires 130, 131, the remaining terminal of said relay being grounded.

The switch contacts 122 of relay $R_3$ are connected between the +12 volt line 129 and one terminal of relay $R_4$, via wires 132, 133. The remaining terminal of relay $R_4$ is grounded.

One terminal of the winding of the relay $R_2$ is connected via a wire 134 and the switch contacts 123 of relay $R_4$ to the +12 volt line 129. The remaining terminal of the winding of said relay $R_2$ is grounded.

One terminal of the winding of relay $R_1$ is connected via a wire 135 and the switch contacts 121 of relay $R_2$ to the +12 volt line 129. The remaining terminal of the relay winding is grounded.

The "extend" solenoid 103 of indexing cylinder valve 97 is connected between ground and wire 135, via a wire 136 and a normally closed microswitch 144. Microswitch 144 is held closed by a lug 145 on sleeve member 29 in its elevated normal position. Microswitch 144 opens shortly after sleeve member 29 starts its descent, and closes when said sleeve member completes its ascent on its upstroke, as will be presently described.

The solenoid 107 of the auger motor valve 105 is connected between ground and a +12 volt terminal wire 137, via a wire 138 and a normally open microswitch 139. Microswitch 139 is held open by a lug 140 on sleeve member 29 in its normal elevated position, said microswitch closing when the sleeve member starts to move downwardly, thus energizing the auger motor 42.

The solenoid 112 of the index plate lowering and raising valve 108 is connected between ground and wire 134, via a wire 141.

The solenoid 117 of the packing cylinder valve 113 is connected between ground and the +12 volt line 129, via a wire 142 and the switch contacts 120 of relay $R_1$.

The solenoid 119 of scraper cylinder valve 118 is connected between ground and wire 135 via a wire 143.

The solenoid of water valve 87 is connected between wire 135 and ground via a wire 146 and the microswitch 89, closed for a short time period when lug 88 moves therepast, as above mentioned.

Figure 11:
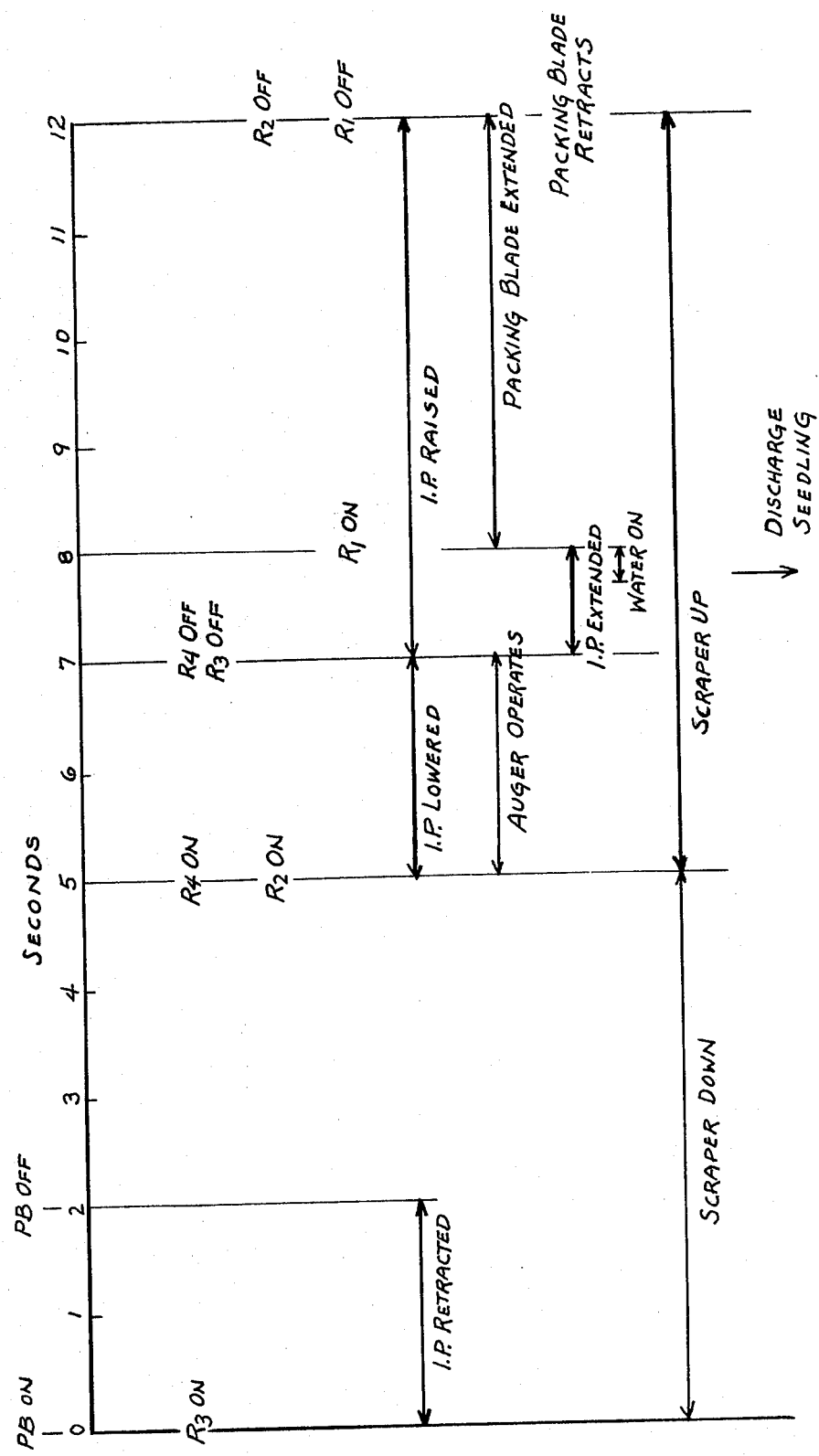
FIG. 11 is a timing diagram for the typical programming system of FIG. 10.

Referring to FIGS. 10 and 11, in operation a typical cycle begins with the retraction of index plate 33 by actuation of the push button switch 126 and holding the button thereof pressed for a short time, for example, two seconds. The actuation of the push button causes pole 125 to bridge the lower contacts of the switch to thereby energize the "retract" solenoid 102 of valve 97. The simultaneous bridging of the upper switch contacts by upper pole 128 energizes the off-delay relay $R_3$ via wires 130, 131, which will close its contacts 122 and hold them closed for 5 seconds after the push button is released, namely, until the 7-second point of the cycle is reached. The index plate 33 is thus moved to the dotted view position thereof of FIG. 10 from its previous full-line extended position. The scraper blade 49, being in its lowered position, thus scrapes the ground area where a seedling is to be planted, and the auger 45 is brought to a position over the planting site.

Since the contacts 122 of relay $R_3$ are closed so as to energize the on-delay relay $R_4$, at the 5-second point of the cycle contacts 123 close. This turns on relay $R_2$, causing contacts 121 to close and at the same time energizes solenoid 112 of the index plate lowering and raising cylinder valve 108, causing sleeve member 29 to move downwardly; this opens microswitch 144 and closes microswitch 139, energizing the solenoid 107 of the auger motor valve 104 via wire 138. Thus, the index plate 33 moves downwardly and the auger rotates, causing a planting hole 53 to be dug. The closure of contacts 121 connects wire 135 to the +12 volt line wire 129, which energizes solenoid 119 of the scraper cylinder 118 via wire 143 and causes the scraper blade to be raised, so that it does not hinder the descent of the auger.

As the 7-second point of the cycle is reached, relay $R_3$ times out, opening contacts 122, whereby relay $R_4$ becomes deenergized, opening contacts 123. This deenergizes the solenoid 112 of the valve 108, restoring said valve to its original configuration and causing cylinder 30 to raise the index plate 33 and auger 45 to their original elevation. Also, the auger motor 42 is turned off by the opening of microswitch 139 by lug 140 as sleeve member 29 reaches its upper limit of travel. As this upper limit is reached, microswitch 144 is closed by lug 145. This energizes the "extend" solenoid 103 of indexing cylinder valve 97 via wire 136, causing index plate 33 to be extended from the dotted view position to the full-line position thereof in FIG. 10. As this occurs, the the pawl element 75 (FIGS. 1 to 4) or 76 (FIGS. 5, 6 and 8) engages a ratchet tooth 71 on the containerized seedling rotatable carrier and moves a seedling container 70 into vertical registry with the subjacent stationary discharge opening 60 and drop tube 46, and with the upwardly adjacent vertical water discharge conduit 86.

As the index plate 33 rotates to its extended full-line position of FIG. 10, which takes place in about 1 second, the cam 88 engages and moves past the plunger of microswitch 89 near the end of the extension stroke and thereby energizes the solenoid of water valve 87, providing a short-length period of discharge of pressurized water through conduit 86 into the newly presented seedling container 70.

The burst of pressurized water has sufficient force to drive the seedling into the hole 53 and provides the seedling and the adjacent soil with an adequate initial amount of moisture for subsequent growth.

Three seconds after contacts 121 of relay $R_2$ close, namely, at the 8-second point of the cycle, the contacts 120 of on-delay relay $R_1$ close, said relay $R_1$ having been energized via wire 135 and contacts 121. This energizes the solenoid 117 of packing cylinder valve 113 via wire 142 and causes packing cylinder 50 to be operated so as to extend the packing blade 52 and to pack the soil around the newly planted seedling.

When relay $R_2$ times out, namely, 5 seconds after the opening of contacts 123 of relay $R_4$, at the 12-second point of the cycle, relay $R_1$ becomes deenergized by the opening of contacts 121 and opens its contacts 120. This deenergizes packing cylinder valve solenoid 117 and causes the packing cylinder 50 to retract the packing blade 52 to its original starting position.

At this point all the relays $R_1$ to $R_4$ are deenergized, with the index plate 33 in its elevated extended position in FIG. 10, and the remaining parts in position to repeat the above-described cycle responsive to another actuation of the push button switch 126. The machine is therefore now reset to repeat the cycle after being moved to the next planting location.

While certain specific embodiments of an improved machine for planting containerized tree and shrub seedlings have been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. A seedling planter comprising portable frame means, vertical bearing shaft means mounted on said frame means, a horizontal index plate rotatably and slidably connected to said vertical shaft means and being movable between two vertically spaced levels on said vertical shaft means, depending auger means carried by said index plate at a radial distance from said vertical shaft means, said index plate having a seedling discharge opening at said radial distance but spaced from said auger means, said index plate being rotatable between a retracted position and an extended position, means to lower said index plate in said retracted position so that said auger means forms a planting hole, means to thereafter raise said index plate and rotate it horizontally to said extended position, said discharge opening being in vertical registry with said planting hole in said extended position of the index plate, carousel seedling tray means mounted to rotate around said vertical shaft means, said tray means being peripherally formed to carry a plurality of evenly spaced vertical tubular seedling containers at said radial distance, means to rotate said tray means in steps such as to cause such vertical containers to respectively communicatively register with said discharge opening when the index plate is brought to said extended position, and means to inject water under pressure into the top end of a registering seedling container responsive to the movement of said index plate to said extended position, whereby to move a seedling downwardly from its container into the planting hole previously dug by the auger means.

2. The seedling planter of claim 1, and extensible soil packing blade means carried by said frame means and located adjacent to the site of the planting hole.

3. The seedling planter of claim 2, and means to extend said packing blade means against the soil adjacent to the planting hole after the seedling has been moved into said planting hole.

4. The seedling planter of claim 1, and retractile scraping blade means depending from the index plate at said radial distance and being located between said auger means and said discharge opening.

5. The seedling planter of claim 4, and means to elevate said scraping blade means substantially out of ground contact when said index plate and auger means are lowered to form a planting hole.

6. The seedling planter of claim 1, and wherein said index plate is provided with hydraulic cylinder means to rotate it horizontally between said retracted and extended positions.

7. The seedling planter of claim 6, and wherein said hydraulic cylinder means comprises a hydraulic cylinder pivoted to said frame means and having a piston rod, upstanding vertical shaft means on the index plate, and pivot means on said piston rod slidably and rotatably engaged with said last-named upstanding vertical shaft means.

8. The seedling planter of claim 6, and wherein said means to rotate the tray means in steps comprises evenly spaced ratchet teeth on the periphery of said carousel seedling tray means and pawl means movably coupled to said hydraulic cylinder means and being drivingly engageable with said ratchet teeth responsive to retraction and extension cycles of said index plate performed by said hydraulic cylinder means.

9. The seedling planter of claim 8, and wherein said pawl means is resiliently connected to said hydraulic cylinder means.

10. The seedling planter of claim 1, wherein said index plate is provided with hydraulic cylinder means to rotate it horizontally between retracted and extended positions, said hydraulic cylinder means comprising a hydraulic cylinder pivoted to said frame means and having a piston rod, upstanding vertical shaft means on the index plate, and pivot means on said piston rod slidably and rotatably engaged on said last-named upstanding vertical shaft means, and wherein said means to rotate the tray means in steps comprises evenly spaced ratchet teeth on the periphery of said tray means, pawl means rotatably mounted on the last-named upstanding vertical shaft means, spring means biasing said pawl means toward driving engagement with said ratchet teeth, and means to disengage said pawl means from the ratchet teeth responsive to retractile movement of said piston rod by allowing the pawl means to drivingly engage the teeth during extension movement of the index plate.

11. The seedling planter of claim 1, and wherein said rotatable carousel tray means and said frame means are provided with cooperating yieldable detent means to yieldably hold the carousel tray means in stepped position when a containerized seedling is in registry with said discharge opening.

12. The seedling planter of claim 11, and retractable scraping blade means depending from the index plate at said radial distance and being located between said auger means and said discharge opening, and means to elevate said scraping blade means substantially out of ground contact when said index plate and auger means are lowered to form a planting hole.

13. The seedling planter of claim 12, and wherein said index plate is provided with hydraulic cylinder means to rotate it horizontally between retracted and extended positions.

14. The seedling planter of claim 13, and wherein said index plate is provided with further hydraulic cylinder means to move it vertically between said vertically spaced levels on said first-named vertical shaft means.

15. The seedling planter of claim 14, and extensible soil packing blade means carried by said frame means and located adjacent to the site of the planting hole, and means to extend said packing blade means against the soil adjacent to the planting hole immediately subsequent to the delivery of the seedling into said planting hole.

16. The seedling planter of claim 15, and wherein said packing blade extension means comprises a further hydraulic cylinder carried by said frame means and being operatively connected to said packing blade means.

17. The seedling planter of claim 15, and timed programming means for first rotating the index plate to said retracted position, then energizing the auger means and lowering the index plate to dig the planting hole, then raising the index plate and auger means, then rotating the index plate to said extended position, activating said water injection means for a brief period as the index plate reaches said extended position, whereby to expel the seedling from its container into the planting hole, then extending the packing blade means to compress soil around the seedling, and then retracting the packing blade means.

* * * * *